US009762626B2

(12) United States Patent
Duby et al.

(10) Patent No.: US 9,762,626 B2
(45) Date of Patent: *Sep. 12, 2017

(54) SYSTEM AND METHOD FOR AS NEEDED CONNECTION ESCALATION

(71) Applicant: SECUREWORKS CORP., Wilmington, DE (US)

(72) Inventors: Carolyn Duby, Westport, MA (US); Mark B. King, Dover, MA (US); Arie LeDell, Somerville, MA (US); Elchanan Oren, Jerusalem (IL); Michael Vincent, Providence, RI (US)

(73) Assignee: SECUREWORKS CORP., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,924

(22) Filed: Jul. 29, 2016

(65) Prior Publication Data
US 2016/0337412 A1  Nov. 17, 2016

Related U.S. Application Data

(63) Continuation of application No. 13/886,798, filed on May 3, 2013, now Pat. No. 9,426,226.

(51) Int. Cl.
*H04L 29/08* (2006.01)
*H04L 29/06* (2006.01)

(52) U.S. Cl.
CPC ........ *H04L 65/1069* (2013.01); *H04L 63/101* (2013.01); *H04L 63/105* (2013.01); *H04L 63/20* (2013.01); *H04L 67/141* (2013.01)

(58) Field of Classification Search
CPC .... H04L 63/105; H04L 63/101; H04L 63/107
See application file for complete search history.

(56) References Cited

U.S. PATENT DOCUMENTS

| 6,161,139 | A | 12/2000 | Win et al. |
| 6,910,041 | B2 | 6/2005 | Exton et al. |
| 7,418,490 | B1 * | 8/2008 | Zhang ................ H04L 12/2602 709/223 |
| 7,467,211 | B1 | 12/2008 | Herman et al. |
| 8,918,594 | B2 | 12/2014 | Albini et al. |
| 2003/0228146 | A1 | 12/2003 | Fortin et al. |
| 2007/0157292 | A1 * | 7/2007 | Danner ................ G06F 21/604 726/4 |
| 2007/0168568 | A1 | 7/2007 | Tsai |
| 2008/0212963 | A1 | 9/2008 | Fortin et al. |

(Continued)

*Primary Examiner* — Lashonda Jacobs
(74) *Attorney, Agent, or Firm* — Larson Newman, LLP (57) ABSTRACT

A method includes selecting a first connection between a connection manager and a managed system, the first connection being associated with a first privilege level, communicating by the connection manager a first command to the managed system via the first connection, determining that a second command is executable on the managed system using a connection that is associated with a second privilege level, the second privilege level being a lower privilege level than the first privilege level, selecting a second connection between the connection manager and the managed system, the second connection being associated with the second privilege level, and communicating, by the connection manager, the second command to the managed system via the second connection.

20 Claims, 4 Drawing Sheets

(56) References Cited

U.S. PATENT DOCUMENTS

| | | |
|---|---|---|
| 2008/0313417 A1 | 12/2008 | Kim et al. |
| 2010/0242083 A1* | 9/2010 | Begum ............... G06F 21/6218 726/1 |
| 2010/0281173 A1* | 11/2010 | Vutukuri ............... G06F 21/305 709/228 |
| 2011/0030036 A1* | 2/2011 | Wells, Jr. ............ G06F 21/6281 726/4 |
| 2013/0086581 A1* | 4/2013 | Frazier .................... G06F 9/462 718/1 |
| 2013/0104204 A1 | 4/2013 | Henry et al. |
| 2014/0033321 A1 | 1/2014 | Patidar et al. |
| 2015/0067254 A1 | 3/2015 | Albini et al. |

\* cited by examiner

SYSTEM AND METHOD FOR AS NEEDED CONNECTION ESCALATION

CROSS-REFERENCE TO RELATED APPLICATION

This application is a continuation of U.S. patent application Ser. No. 13/886,798, entitled "System and Method for As Needed Connection Escalation," filed on May 3, 2015, now U.S. Pat. No. 9,426,226 the disclosure of which is hereby expressly incorporated by reference in its entirety.

FIELD OF THE DISCLOSURE

This disclosure relates generally information handling systems, and more particularly relates to as needed connection escalation in a managed network.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
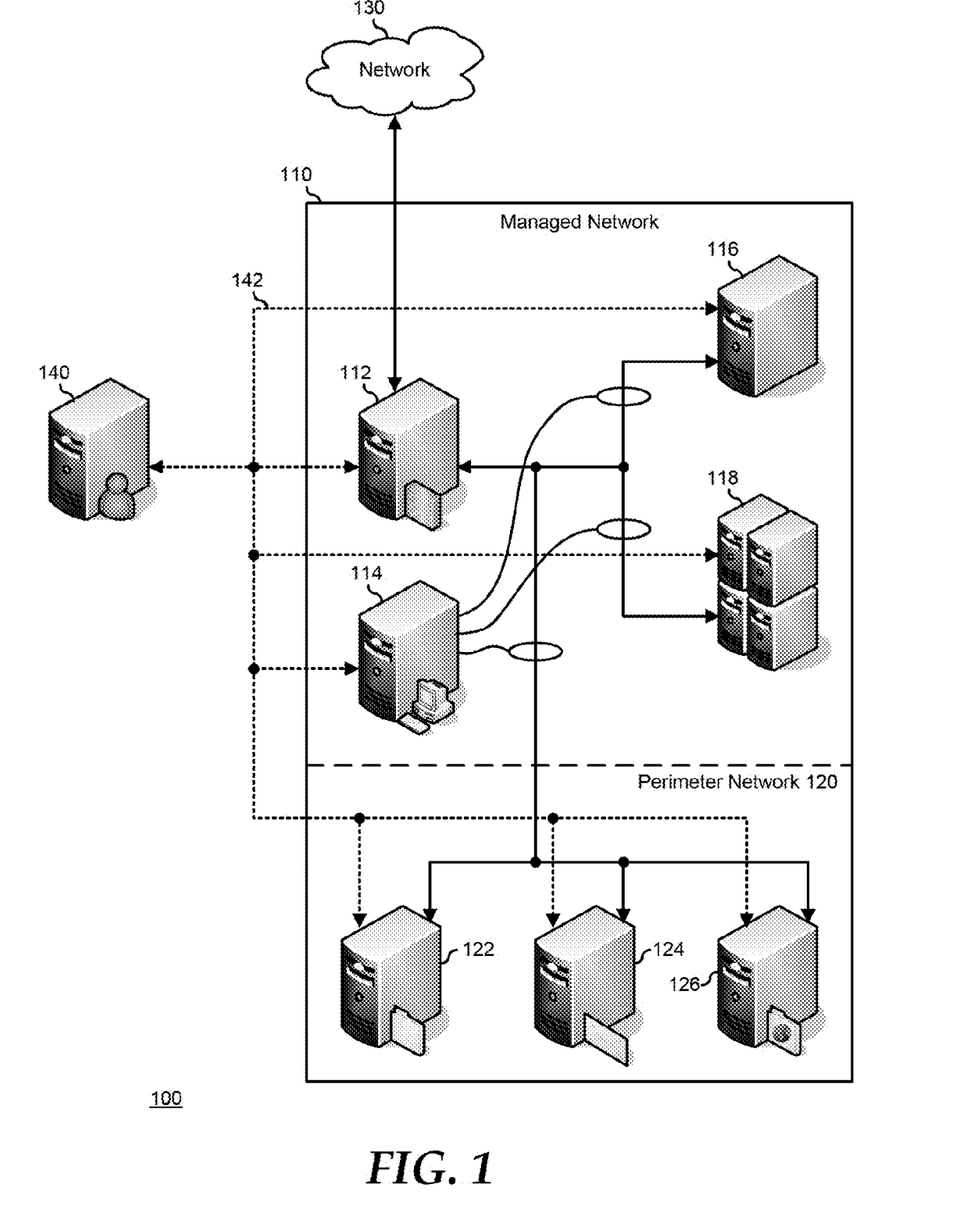
FIG. 1 is a block diagram illustrating a managed system according to an embodiment of the present disclosure.

FIG. 1 illustrates a managed system 100. For purpose of this disclosure managed system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, managed system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Managed system 100 includes a managed network 110, a data network 130, and a management system 140. Managed network 110 represents a network of resources that provide one or more services or functions to network users (not illustrated) who obtain the services and functions of the managed network via network 130. In a particular embodiment, network 130 represents a public network such as the Internet, and the services and functions of managed network 110 represent publicly accessible services and functions, such as free services and functions or subscriber based services or functions. In another embodiment, network 130 represents a private network such as a local intranet, a corporate network, or another private network, and the services and functions of managed network 110 represent services and features that are accessible to users of the private network.

Managed network 110 includes a firewall 112, an intrusion prevention and detection system (IPDS) 114, a server 116, a network storage device 118, and a perimeter network 120. Perimeter network 120 includes a file server 122, a mail server 124, and a web server 126. Perimeter network 120 operates as a sub-network that exposes external-facing services and functions of managed network 120 to a larger untrusted network. For example, managed network 110 can include services and functions of server 116 and network storage device 118 that are provided only to corporate users, and can include services and functions of file server 122, mail server 124, and web server 126 to users of the Internet.

Firewall 112 operates to control the incoming and outgoing traffic on network 130 by analyzing the data packets and determining whether the traffic should be allowed to pass through the firewall based on predetermined rules. For example, firewall 112 can operate to prevent spam e-mail from reaching e-mail server 124, and can prevent the elements of managed network 110 from accessing malicious web sites. IPDS 114 operates to monitor traffic on managed network 110 malicious activity, log information about any malicious activity, and attempt to stop the malicious activity. For example, IPDS 114 can take actions such as sending an alarm, dropping malicious packets, resetting connections, or blocking traffic from the offending Internet protocol (IP) addresses.

Management system 140 represents one or more network management resources for monitoring and directing the operations on managed network 110. In a particular embodiment, management system 140 operates as a part of, and is co-located with the elements of managed network 110. In another embodiment, management system 140 operates separately from, and is located remotely from the elements of managed network 110. Management system 140 is connected to firewall 112, IPDS 114, server 116, network storage device 118, file server 122, mail server 124, and web server 126 via a management network 142. In a particular embodiment, management network 142 represents a separate and dedicated network between management station 140 and the elements of managed network 110. In another embodiment, management network 142 represents an overlay network whereby management system 140 is connected to the elements of managed network 110 via a common network infrastructure as network 130. In yet another embodiment, management network 142 represents a network were one or more of the elements of managed network 110 are connected to management system 140 by a separate network, and other elements of the managed network are connected to the management system by an overlay network.

Management system 140 operates to log in to one or more of the elements of managed network 110 to execute commands and to send and receive data from the elements of the managed network. For example, management system 140 can log in to firewall 112 to gain access to event logs, to receive alerts, to update firewall rules, or other functions that relate to the operation of the firewall. Similarly, management system 140 can log in to each of the other elements of managed network 110 to execute commands that access the functions and features of the other elements. In a particular embodiment, the commands associated with one or more of the elements of managed network 110 are proprietary to the particular element. In another embodiment, the commands associated with one or more of the elements of managed network 110 are common with one or more other element. For example, firewall 112 and IPDS 114 can be from a common manufacturer or can operate according to a common standard, such that a subset of the commands executable on both the firewall and the IPDS operate similarly on each element. In another example, file server 122, mail server 124, and web server 126 can operate using a common operating system (OS), such as a Windows OS, a Linux OS, or another OS, as needed or desired.

The commands associated with each of the elements of managed network 110 are each associated with a privilege level that determines whether a particular user or script that is logged on to the associated device has access to the functions of the commands. For example, IPDS 114 can include a first and most privilege level, hereinafter referred to as a level-0 privilege. Here, a user that is logged on to IPDS 114 with a level-0 privilege connection can have access to all commands that are executable on the IPDS. IPDS 114 can also include a second and less privilege level, hereinafter referred to as a level-1 privilege. Here, a user that is logged on to IPDS 114 with a level-1 privilege connection can have access to a subset of the commands that permits the user to execute any read function on the IPDS. Moreover, IPDS 114 can include a third and lowest privilege level, hereinafter referred to as a level-2 privilege. Here, a user that is logged on to IPDS 114 with a level-2 privilege connection can have access to another subset of the commands that permits the user to execute only read functions on the IPDS that are associated with alerts and log entries. The skilled artisan will recognize that one or more additional privilege levels can be configured on the elements of managed network 110, each being associated with a different subset of commands. Moreover, the skilled artisan will recognize that the identification of higher privilege levels with lower numbers is a matter of convention, and that one or more of the elements of managed network 110 may associate higher privilege levels with higher numbers or letters, without violating the intent of the present disclosure. Table 1, below, illustrates an exemplary embodiment of the commands executable on IPDS 114, and the associated privilege levels for each command.

TABLE 1

Command/Privilege Level Associations

| Command | Privilege Level |
| --- | --- |
| Write Control Register | 0 |
| Read Status Register | 0, 1 |
| Read Alerts and Logs | 0, 1, 2 |

Management system 140 operates to classify administrators into groups, based upon the privilege levels that each particular administrator can access. Here, a particular group of administrators may have the highest privilege level on one or more of the elements of managed network 110, while another group may have lower level privileges. In this way, each element of managed network 110 does not need to include separate log on credentials for each administrator, but instead has a log on credential for each privilege level implemented thereon. Further, as the personnel associated with management system 140 change, personnel who leave can be removed from the associated groups, and new personnel can be added to the groups, without having to reconfigure the elements of managed network 110. Thus, in a particular embodiment, each administrator has their own log on credentials for logging on to management system 140, which then manages the connections to the elements of managed network 110 as described below, and the administrators may, or may not have their own log-in credentials for the elements of the managed network, as needed or desired.

Table 2, below, illustrates an exemplary embodiment of groups of administrators and their associated privilege levels. Here, group I may have access all commands on all of the elements of managed network 110, group II may have access to all commands on the elements of perimeter network 120 and read access to alerts and logs on all elements of managed network 140, group III may have read access to all registers, alerts, and logs on server 116 and on network storage device 118, group IV may have access to all commands on firewall 112 and on IPDS 114, and have read access to all registers, alerts, and logs on all of the elements of the managed network, and group V may have access only to read alerts and logs on all the elements of the managed network. In a particular embodiment, management system 140 operates to further restrict the commands available to the administrators by subdividing the privilege levels available on the elements of managed network 110 into subgroups of commands, and then forming groups of administrators that have access to the different subgroups of commands. For example, privilege level-0 for firewall 112 may include commands that permit an administrator to modify firewall rules and commands that permit the administrator to create, modify, or delete files in the firewall. Here, management system 140 can provide a first subgroup including the rules commands and a second subgroup including the files commands, and can grant different administrator groups access to the command subgroups.

TABLE 2

Administrator Privilege Level Associations

| Group | Level 0 | Level 1 | Level 2 |
|---|---|---|---|
| I | All | All | All |
| II | Perimeter Network | Perimeter Network | All |
| III | None | Server and Storage | Server and Storage |
| IV | Firewall and IPDS | All | All |
| V | None | None | All |

In a particular embodiment, an administrator of management system 140 who has level-0 access to one or more of the elements of managed network 110, such as administrators in groups I, II, or IV, will be logged in to the one or more elements with a level-0 connection, so as to be able to execute any command, such as a register write, a register read, or an alert or log read, on the one or more elements as needed or desired. Similarly, an administrator of management system 140 who has no level-0 access, but has level-1 access to one or more of the elements of managed network 110, such as administrators in group III, will be logged in to the one or more elements with a level-1 connection, so as to be able to execute any register, alert or log read, on the one or more elements as needed or desired. Also, an administrator of management system 140 who has no level-0 or level-1 access, but has level-2 access to one or more of the elements of managed network 110, such as administrators in group V, will be logged in to the one or more elements with a level-2 connection, so as to be able to execute any alert or log read on the one or more elements as needed or desired.

In another embodiment, each administrator is logged on to the elements of managed network 110 at a lowest available privilege level necessary to execute a particular command. For example, even if an administrator has unlimited level-0 privileges for one or more elements of managed network, but is only executing alert and log read commands on file server 122, then the administrator will be logged on to the file server with a level-2 connection instead of a level-0 connection. If, later, the same administrator is executing commands to write to the registers of file server 122, the administrator will be logged off of the level-2 connection, and will be logged on to the file server with a level-0 connection. Again, if later the same administrator is executing commands to read the registers of file server, the administrator will be logged off of the level-0 connection, and will be logged on to the file server with a level-1 connection. In another embodiment, management system 140 can keep each administrator logged on to the elements of managed network 110 at the lowest available privilege level, and then, when an administrator requests a higher privilege level command, the management system can execute the particular command at the elevated privilege level (e.g., by performing a Linux "sudo" operation in association with the command), or can temporarily initiate a session at the raised privilege level (e.g., by performing Linux "su" and "exit" operations). In another embodiment, once a particular administrator's privilege level has been elevated, that administrator's session will remain at the elevated privilege level, thereby avoiding excessive bouncing between privilege levels. In yet another embodiment, in environments where the "su" operations are not available, then the administrator connection information for the lower privilege level session is cached by management system 140, so that the administrator does not have to reconnect each time the privilege level is lowered or raised.

In a particular embodiment, management system 140 operates to audit and log the commands requested by the administrators. This may be useful in determining if different privilege levels need to be ascribed to a particular administrator, or whether a particular administrator is attempting to gain unauthorized access to the elements of managed network 110.

Management system 140 also operates to classify scripts into groups, based upon the privilege levels of the commands that are executed by each particular script. Here, a particular script may include commands that require a level-0 connection to successfully run on one or more of the elements of managed network 110, another script may include commands that require a level-1 connection, and yet another script may include commands that only require a level-2 connection. In a particular embodiment, a script that includes commands that require level-0 access to one or more of the elements of managed network 110 will be logged in to the one or more elements with a level-0 connection, so as to be able to execute the entire script. Similarly, a script that includes level-1 privilege level commands will be logged in with a level-1 connection, and a script that only includes level-2 privilege level commands will be logged in with a level-2 connection. In another embodiment, each script is logged on to the elements of managed network 110 at a lowest available privilege level necessary to execute a particular command of the script. For example, even if a script includes level-0 commands, but is only executing alert and log read commands on file server 122, then the script will be logged on to the file server with a level-2 connection instead of a level-0 connection, and will be logged off of the level-2 connection, and will be logged on to the file server with a level-0 connection when the commands require a level-0 connection.

Figure 2:
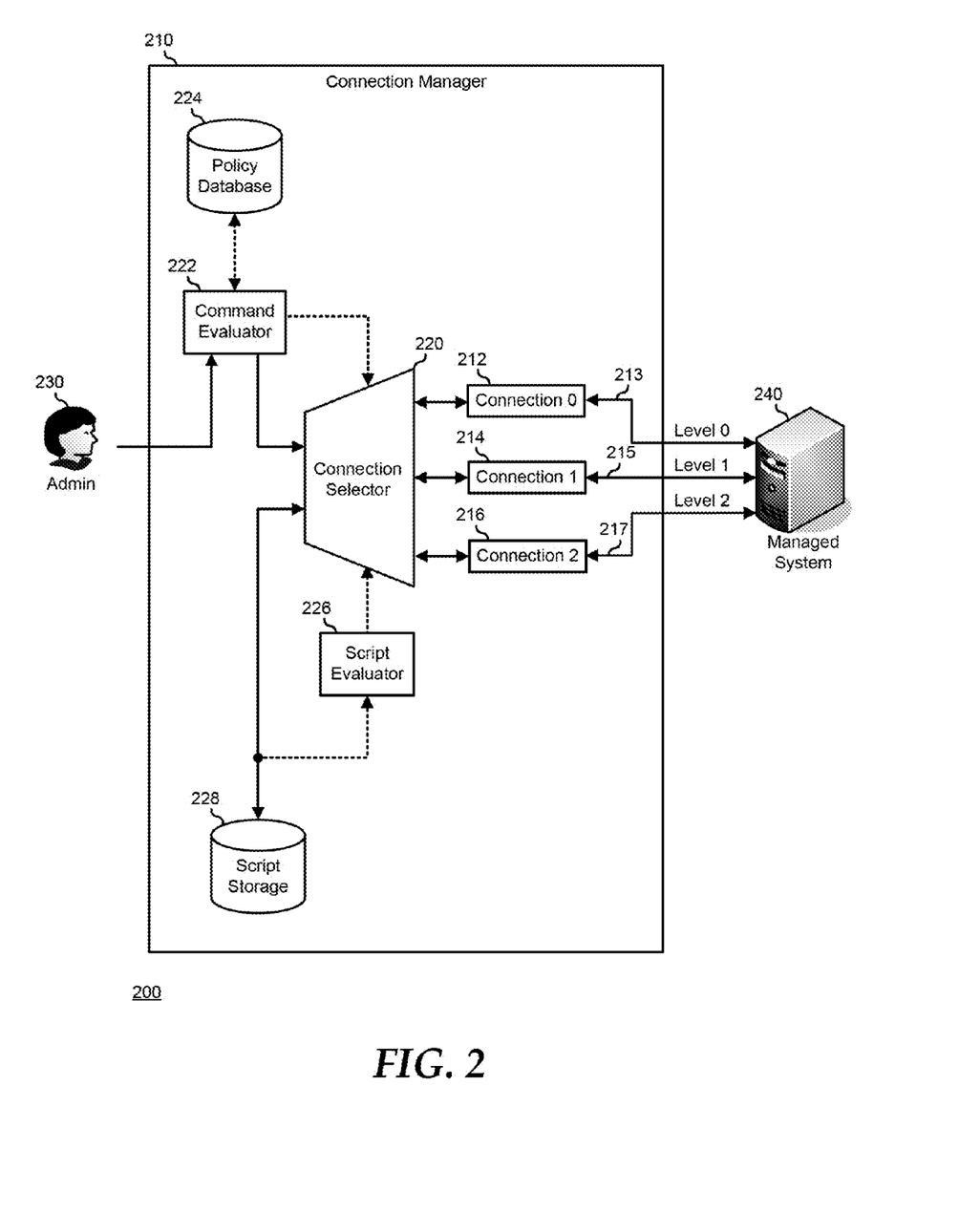
FIG. 2 is a block diagram illustrating a management system according to an embodiment of the present disclosure.

FIG. 2 illustrates a management system 200 similar to management system 140, including a connection manager 210 and one or more administrators 230. Connection manager 210 includes connection engines 212, 214, and 216, a connection selector 220, and command evaluator 222, a policy database 224, a script evaluator 226, and a script storage 228. Connection manager 210 operates to establish connections to a managed system 240, similar to one or more of the elements of managed network 110. In a particular embodiment, connection engine 212 establishes a single connection 213 at level-0 with managed system 240, connection engine 214 establishes a single connection 215 at level-1 with the managed system, and connection engine 216 establishes a single connection 217 at level-2 with the managed system. Here, connection engines 212, 214, and 216 each include a unique authentication credential for securely establishing each of connections 213, 215, and 217 with managed system 240. In another embodiment, connection engines 212, 214, and 216 each include multiple authentication credentials, and connections 213, 215, and 217 represent multiple connections at the associated privilege level, where each connection is associated with a particular administrator or group of administrators. An example of an authentication credential can include a username/password pair, an encrypted key, another authentication credential, or a combination thereof. In another embodiment, connections 213, 215, and 217 represent a single connection between connection manager 210 and managed system 240, and connection engines 212, 214, and 216 operate to provide the associated privilege level connections over the single connection.

Connection selector 220 operates to receive commands for managed system 240 and to select one of connection engines 212, 214, or 216, over which to transmit the commands to the managed system. The commands are received from administrator 230 or from script storage 228. Administrator 230 represents an individual or group of individuals that are associated with management system 200, and that are authenticated onto the management system. The skilled artisan will recognize that various method for the management of the authentication of individuals or groups of individuals are known in the art. When a command is received from administrator 230, command evaluator 222 evaluates the command by checking policy database 224 to determine if the administrator has the requisite privilege level to execute the command. For example, policy database 224 can include a command/privilege level association table similar to Table 1, above, and an administrator privilege level association table similar to Table 2, above. Command evaluator 222 can look up the command in the command/privilege level association table to determine the privilege level associated with the command, and can look up administrator 230 in the administrator privilege level association table to determine if the administrator has the requisite privilege level to execute the command. If not, command evaluator 222 provides a message back to administrator 230, indicating that the administrator does not have the requisite privilege level to execute the requested command. If the administrator has the requisite privilege level to execute the command, then command evaluator 222 forwards the command to connection selector 220 and provides a control input to connection selector that directs the connection selector as to which connection 213, 215, or 217 to use to forward the command to managed system 240.

In another embodiment, administrator 230 can issue any command to managed system 240 on a previously established connection 213, 215, or 217. Then, if managed system 240 determines that the command is received on a connection that does not have the requisite privilege level to execute the command, the managed system returns an error message to connection manager 210 on the previously established connection. Here, command evaluator 222 evaluates the command by checking policy database 224 to determine if administrator 230 has the requisite privilege level to execute the command. If not, command evaluator 222 provides a message back to administrator 230, indicating that the administrator does not have the requisite privilege level to execute the requested command. If the administrator has the requisite privilege level to execute the command, then command evaluator 222 reissues the command to connection selector 220 and provides a control input to connection selector that is directed to one of connections 213, 215, or 217 to use to reissue the command to managed system 240. In another embodiment, connection manager 210 can query administrator 230 as to whether or not to escalate the privilege level and to reissue the command.

When a command is received from script storage 228, script evaluator 226 evaluates the script to determine a minimum privilege level needed to execute the script, forwards the command to connection selector 220, and provides a control input to connection selector that directs the connection selector as to which connection 213, 215, or 217 to use to forward the command to managed system 240. If, in the course of executing the initial script, a sub-script is called for, or the initial script is completed and a new script is executed, script evaluator 226 evaluates the sub-script or the new script to determine a minimum privilege level needed for execution, and provides a control input to connection selector to select an appropriate connection 213, 215, or 217.

Figure 3:
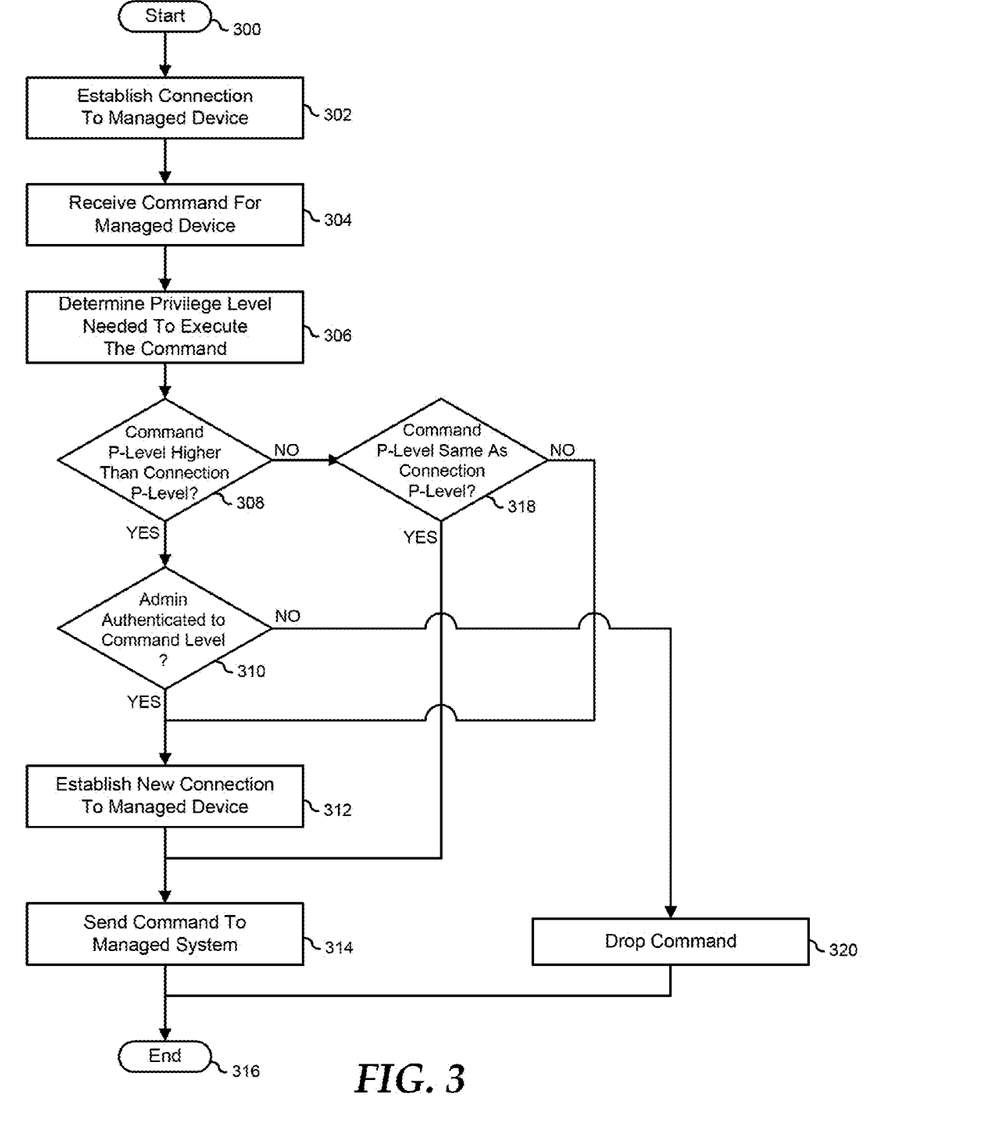
FIG. 3 is a flow chart illustrating a method for providing as needed connection escalation in a managed network according to an embodiment of the present disclosure.

FIG. 3 illustrates a method for providing as needed connection escalation in a managed network, starting at block 300. A connection between an element of a managed network and a management system is established in block 302. For example, a connection engine can establish a connection with a managed system. A command is received by the management system in block 304. Here, a command for the managed system can be received from an administrator or from a script. A privilege level associated with the command is determined in block 306. Here, a command/privilege level association table can be checked to determine what privilege level is required in order to execute the command on the managed system. A decision is made as to whether or not the privilege level associated with the command is higher than the privilege level associated with the connection in decision block 308.

If so, the "YES" branch of decision block 308 is taken and a decision is made as to whether or not the administrator is authenticated to execute commands at the privilege level associated with the command in decision block 310. For example, an administrator privilege level association table can be checked to determine what privilege level the administrator is authenticated to execute commands. If the administrator is authenticated to execute commands at the privilege level associated with the command, the "YES" branch of decision block 310 is taken, a new connection to the managed system is established at the privilege level associated with the command in block 312, the command is sent to the managed system in block 314, and the method ends in block 316.

If the administrator is not authenticated to execute commands at the privilege level associated with the command, the "NO" branch of decision block 310 is taken, the command is dropped in block 320, and the method ends in block 316. Returning to decision block 308, if the privilege level associated with the command is not higher than the privilege level associated with the connection, the "NO" branch of decision block 308 is taken and a decision is made as to whether or not the privilege level associated with the command is the same as the privilege level associated with the connection in decision block 318. If so, the "YES" branch of decision block 318 is taken, the command is sent to the managed system in block 314, and the method ends in block 316. If the privilege level associated with the command is not the same as the privilege level associated with the connection, the "NO" branch of decision block 318 is taken, a new connection to the managed system is established at the privilege level associated with the command in block 312, the command is sent to the managed system in block 314, and the method ends in block 316.

Figure 4:
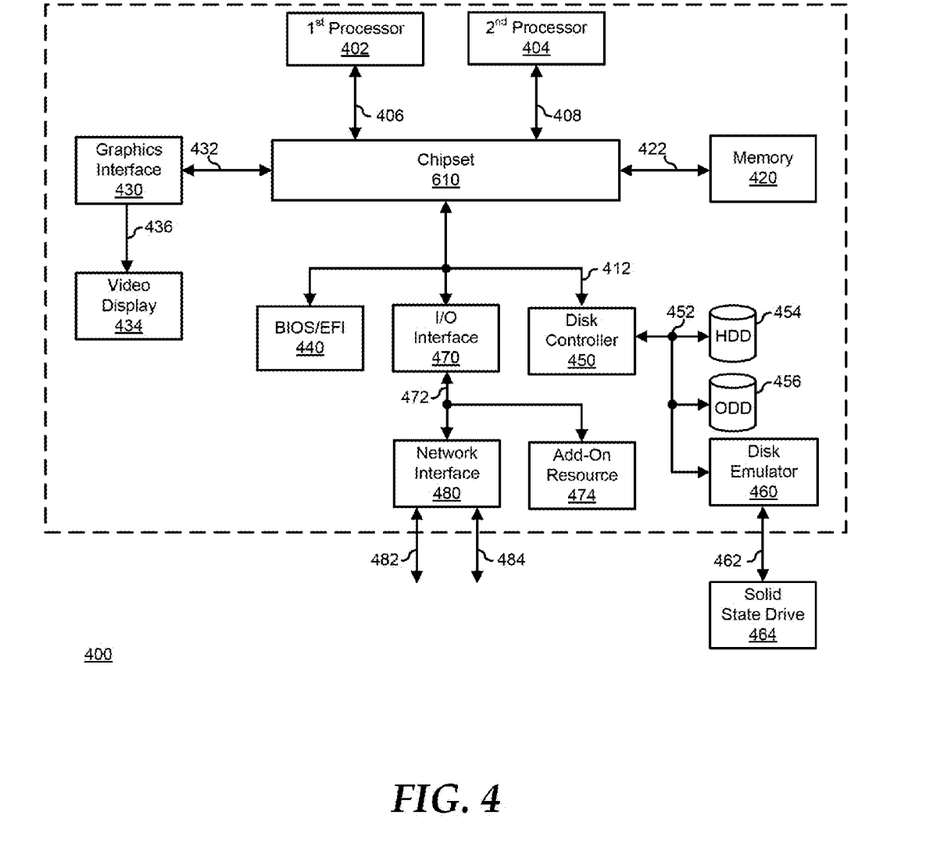
FIG. 4 is a block diagram illustrating a generalized information handling system according to an embodiment of the present disclosure.

FIG. 4 illustrates a generalized embodiment of information handling system. Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422 Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be coupled to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474 and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, by a connection manager, a first command for a managed system from a command source, the first command associated with a first privilege level on the managed system;
   determining, by the connection manager, that the command source has a first privilege level authorization on the managed system in response to receiving the first command, the first privilege level authorization being associated with the first privilege level;
   establishing a first connection between the connection manager and the managed system in response to determining that the command source has the first privilege level authorization on the managed system, the first connection being associated with the first privilege level;

communicating, by the connection manager, the first command to the managed system via the first connection;

receiving, by the connection manager, a second command for the managed system from the command source, the second command associated with a second privilege level on the managed system, the second privilege level being a lower privilege level than the first privilege level;

determining, by the connection manager, that the command source has a first privilege level authorization on the managed system in response to receiving the second command, the second privilege level authorization being associated with the second privilege level;

establishing a second connection between the connection manager and the managed system in response to determining that the command source has the second privilege level authorization on the managed system, the second connection being associated with the second privilege level; and communicating, by the connection manager, the second command to the managed system via the second connection.

2. The method of claim 1, further comprising:
closing the first connection in response to establishing the second connection.

3. The method of claim 2, further comprising:
receiving, by the connection manager, a third command for the managed system from the command source, the third command associated with a third privilege level on the managed system, the third privilege level being a higher privilege level than the second privilege level;

determining, by the connection manager, that the command source has a third privilege level authorization on the managed system in response to receiving the third command, the third privilege level authorization being associated with the third privilege level;

establishing a third connection between the connection manager and the managed system in response to determining that the command source has the third privilege level authorization on the managed system, the third connection being associated with the third privilege level; and communicating, by the connection manager, the third command to the managed system via the third connection.

4. The method of claim 3, further comprising:
closing the second connection in response to establishing the third connection.

5. The method of claim 1, wherein in determining that the command source has a first privilege level authorization on the managed system, the method further comprises:
providing the first command to a command evaluator; and
checking, by the command evaluator, a policy database to determine if the command source has the first privilege level authorization.

6. The method of claim 1, wherein the command source comprises a command script.

7. The method of claim 1, wherein the command source comprises an administrator.

8. A connection manager for a managed network, the connection manager comprising:
a memory including code; and
a processor to execute the code to:

receive a first command for a managed system from a command source, the first command associated with a first privilege level on the managed system;

determine that the command source has a first privilege level authorization on the managed system in response to receiving the first command, the first privilege level authorization being associated with the first privilege level;

establish a first connection between the connection manager and the managed system in response to determining that the command source has the first privilege level authorization on the managed system, the first connection being associated with the first privilege level;

communicate the first command to the managed system via the first connection;

receive a second command for the managed system from the command source, the second command associated with a second privilege level on the managed system, the second privilege level being a lower privilege level than the first privilege level;

determine that the command source has a first privilege level authorization on the managed system in response to receiving the second command, the second privilege level authorization being associated with the second privilege level;

establish a second connection between the connection manager and the managed system in response to determining that the command source has the second privilege level authorization on the managed system, the second connection being associated with the second privilege level; and communicate the second command to the managed system via the second connection.

9. The connection manager of claim 8, the processor further to execute the code to:
close the first connection in response to establishing the second connection.

10. The connection manager of claim 9, the processor further to execute the code to:
receive a third command for the managed system from the command source, the third command associated with a third privilege level on the managed system, the third privilege level being a higher privilege level than the second privilege level;

determine that the command source has a third privilege level authorization on the managed system in response to receiving the third command, the third privilege level authorization being associated with the third privilege level;

establish a third connection between the connection manager and the managed system in response to determining that the command source has the third privilege level authorization on the managed system, the third connection being associated with the third privilege level; and communicate the third command to the managed system via the third connection.

11. The connection manager of claim 10, the processor further to execute the code to:
close the second connection in response to establishing the third connection.

12. The connection manager of claim 8, wherein, in determining that the command source has a first privilege level authorization on the managed system, the processor further to execute the code to:
check a policy database to determine if the command source has the first privilege level authorization.

13. The connection manager of claim 8, wherein the command source comprises a command script.

14. The connection manager of claim 8, wherein the command source comprises an administrator.

15. A non-transitory computer-readable medium including code for performing a method, the method comprising:
  receiving, by a connection manager, a first command for a managed system from a command source, the first command associated with a first privilege level on the managed system;
  determining that the command source has a first privilege level authorization on the managed system in response to receiving the first command, the first privilege level authorization being associated with the first privilege level;
  establishing a first connection between the connection manager and the managed system in response to determining that the command source has the first privilege level authorization on the managed system, the first connection being associated with the first privilege level;
  communicating the first command to the managed system via the first connection;
  receiving a second command for the managed system from the command source, the second command associated with a second privilege level on the managed system, the second privilege level being a lower privilege level than the first privilege level;
  determining that the command source has a first privilege level authorization on the managed system in response to receiving the second command, the second privilege level authorization being associated with the second privilege level;
  establishing a second connection between the connection manager and the managed system in response to determining that the command source has the second privilege level authorization on the managed system, the second connection being associated with the second privilege level; and
  communicating the second command to the managed system via the second connection.

16. The computer-readable medium of claim 15, further method comprising:
  closing the first connection in response to establishing the second connection.

17. The computer-readable medium of claim 16, further method comprising:
  receiving, by the connection manager, a third command for the managed system from the command source, the third command associated with a third privilege level on the managed system, the third privilege level being a higher privilege level than the second privilege level;
  determining, by the connection manager, that the command source has a third privilege level authorization on the managed system in response to receiving the third command, the third privilege level authorization being associated with the third privilege level;
  establishing a third connection between the connection manager and the managed system in response to determining that the command source has the third privilege level authorization on the managed system, the third connection being associated with the third privilege level; and
  communicating, by the connection manager, the third command to the managed system via the third connection.

18. The computer-readable medium of claim 17, further method comprising:
  closing the second connection in response to establishing the third connection.

19. The computer-readable medium of claim 15, wherein in determining that the command source has a first privilege level authorization on the managed system, the method further comprises:
  providing the first command to a command evaluator; and
  checking, by the command evaluator, a policy database to determine if the command source has the first privilege level authorization.

20. The computer-readable medium of claim 15, wherein the command source comprises one of a command script and an administrator.

* * * * *